Patented June 14, 1932

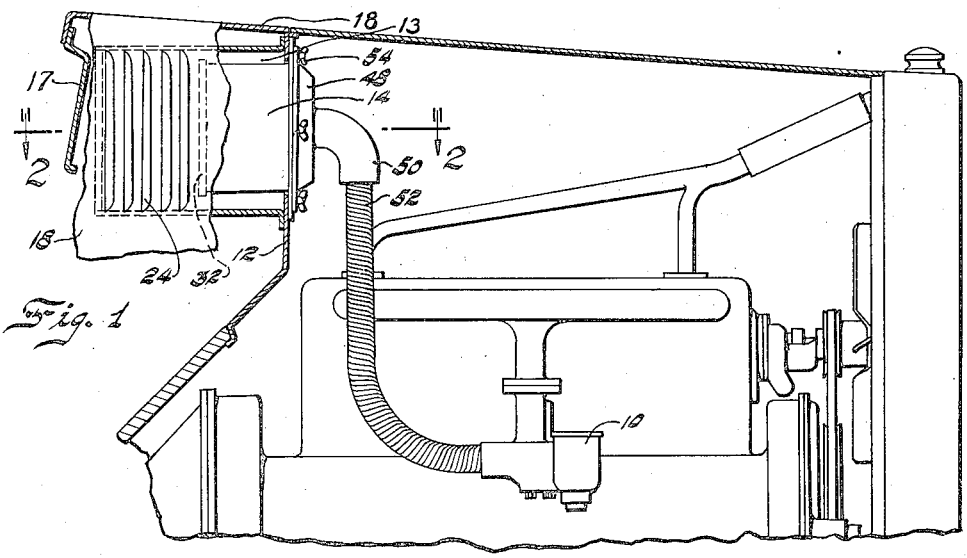
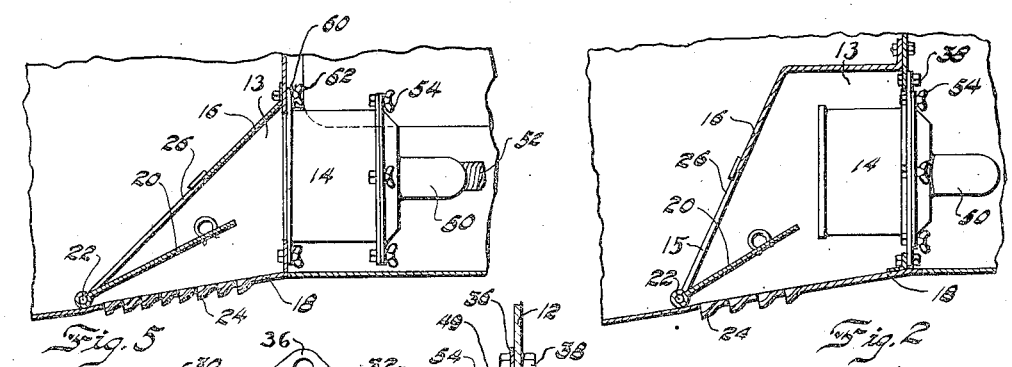
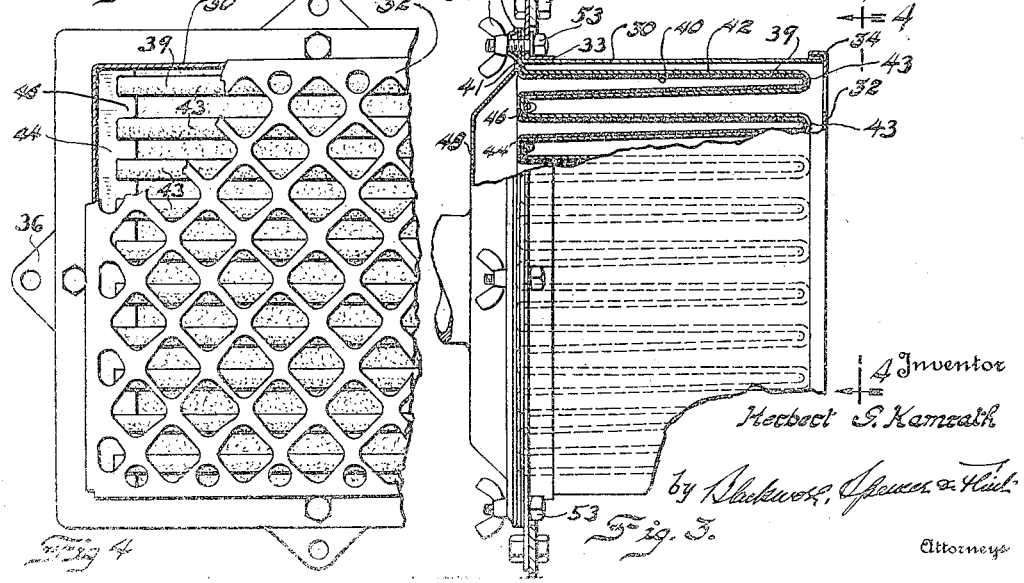

1,863,015

UNITED STATES PATENT OFFICE

HERBERT G. KAMRATH, OF FLINT, MICHIGAN, ASSIGNOR TO A C SPARK PLUG COMPANY, OF FLINT, MICHIGAN, A COMPANY OF MICHIGAN

AIR FILTER

Application filed August 13, 1927. Serial No. 212,696.

This invention relates to an air cleaner for the internal combustion engine of an automotive vehicle.

Under certain operating conditions and for certain classes of service, a cloth type of filter is often desirable. Dump trucks, for instance, engaged in construction or quarry work are continually exposed to large amounts of dust, even under idling conditions. Cloth filters mounted to take in air from under the hood are inefficient because they soon become clogged with oil. It is an object of the present invention to mount a cloth filter where air may be taken in from either the outside or inside of the car. This method insures a supply of air free from oil and in addition provides for ventilation of the car when desired. It is a further object of this invention to provide such a filter which may be quickly and easily disassembled for removal and cleaning or replacement of the cloth and which may be as readily reassembled.

Other objects of the invention will appear in the course of the following description, taken in connection with the accompanying drawing and appended claims.

In the drawing:

Figure 1 is a side view, with parts broken away and in section, of the front end of a car equipped with my improved air filter.

Figure 2 is a section on the line 2—2 of Figure 1.

Figure 3 is a detail plan view of the air filter, with parts broken away and in section.

Figure 4 is a rear view of the filter, taken on the line 4—4 of Figure 3, with parts broken away and in section.

Figure 5 is a view similar to Figure 2, but showing a slightly modified form of my invention.

Referring to the drawing, I have shown in Figure 1 a conventional internal combustion engine mounted in an automotive vehicle and provided with a carburetor 10 connected in the usual way with the intake manifold. Mounted in a suitably shaped opening in the dash and extending rearwardly therethrough into a compartment 13 within the body or cab of the vehicle is an air filter 14. The compartment 13, the walls of which are formed by the dash 12 and the cowl 18 of the vehicle and a casing 16 suitably secured to the dash and cowl, is entirely closed except for an opening 15 in the rear wall of the casing 16 communicating with the interior of the body or cab of the vehicle and louvred openings 24 extending through the side of the cowl and opening directly into the atmosphere. Pivoted as at 22 to the rear edge of the casing 16 and located within the compartment 13 is a valve 20 adapted to be swung to position to close the opening 15 or the openings 24 or to be maintained in an intermediate position by friction or otherwise. If desired, a suitable means may be provided for operating the valve from the instrument panel 17 or from any other desired position within the body or cab of the vehicle.

The filter 14 includes a shell 30 rectangular in cross section and closed at its intake end by a perforated wall 32 secured to one end of the shell by crimping the two parts together as indicated at 34. The opposite end of the shell is surrounded by a flanged collar 33 suitably secured to the shell and having on its flange perforated ears 36 through which extend bolts 38 which secure the shell to the dash.

The filtering element 39 includes a wire screen 40 of zigzag conformation, having outturned portions 41 at its opposite ends and a strip of filtering cloth 42 folded on itself several times to form pockets which are closed at one end and on the sides by suitably securing adjacent side edges of the strip together. The screen 40 and the strip of filtering cloth 42 are adapted, as shown in the drawing, to be assembled with one of the folds of the screen located in each of the pockets in the filtering material. The strip of filtering cloth, it will be noted, has on its opposite ends outturned portions underlying the portions 41 of the screen. The filtering element also includes a plate 44 having therein a large central opening into which tongues 46 which are integral with the plate extend from the opposite sides thereof. After the screen and the strip of filtering cloth have been assembled the plate 44 is adapted to be assembled therewith with its end portions underlying the outturned portions of the strip of filtering cloth and with one of the tongues 46 extending into each end of one of the openings between the pockets in the filter cloth. The filtering element heretofore described is adapted to be positioned in the shell 30 with the pockets 43 opening away from the intake end thereof and with the edges of the plate 44 resting on the flange of the collar 33. The plate 44, it will now be obvious, has the function of securing the strip of filtering cloth to the screen and, also, when the filter element is positioned in the shell the function of preventing air passing through the shell without passing through the strip of filtering cloth. A cover plate 48, provided with an elbow 50 connected by a flexible tube 52 with the air intake of the carburetor 10, fits over the edge of the screen; the shell, the plate 44, the strip of filtering cloth, the screen and the cover plate being held together by bolts 53 provided with wing nuts 54. The wire screen may be soldered to the rim 49 of the cover plate 48 as the cloth 42 is the only part that needs to be removed and cleaned or replaced.

In the modification shown in Figure 5, the shell carrying the filter element is mounted to extend forward from the dash instead of rearward as shown in the other figures. The construction is the same as that shown in the preceding figures except that the aperture in the dash is slightly smaller than the wall 32 and the shell is held against the dash by means of clips 60 fitting over the crimped edges 34 of the casing and the wall 32 and held to the dash 12 by means of bolts 62.

The installations hereinbefore described operate as follows: When the engine is running air will be drawn, by the suction produced in the engine cylinders, into the compartment 13, thence into the shell of the filter, through the screen and filter cloth which serves to remove the dirt therefrom, and into and through the elbow 50 and the tube 52 to the carburetor and engine cylinders. It is obvious that with the arrangement herein disclosed the air for the carburetor may be taken in any desired proportion from the body or cab of the vehicle and from the atmosphere directly by merely shifting the valve 20. It is considered preferable to draw all of the air from the body or cab for since the air which reaches the interior of the body or cab ordinarily must enter through small apertures it will be much cleaner than the outside air, but if this causes too great a draft in the body or cab the valve 20 may be shifted to an intermediate position when a portion of the air will be withdrawn from the body or cab and a portion directly from the atmosphere, or to a position in which the opening 15 is entirely closed when all of the air will be withdrawn directly from the atmosphere. When the vehicle is moving forwardly the air which enters through the louvred openings 24 receives, before it reaches the filter, an initial cleaning due to the fact that under these conditions, the louvres cause the air to take a sharp bend before entering the openings 24, which causes a portion of the foreign matter carried by the air to be removed therefrom by centrifugal action before the air enters the openings 24.

It is obvious that the filtering element which includes the screen, the filter cloth and the plate 44, may be removed from the shell if it is desired to clean or replace the filter cloth merely by removing the wing nuts 54 and the cover 48 and then lifting the filtering element out of the shell. After the filtering element has been removed from the shell, it only is necessary to remove the plate 44 therefrom to enable one to remove the filter cloth from the screen.

It may be mentioned that if desired, the shell 30 may be omitted from the form of the invention shown in Figures 1 to 4.

I claim:

1. In an automotive vehicle including a dash provided with an aperture, a valve chamber on the operator's side of said dash and covering said aperture, openings in said valve chamber leading to the outside and inside of the vehicle respectively, an element movable to close either entrance, and an air inlet including an air filter mounted over said aperture.

2. In an automotive vehicle including a dash provided with an aperture, a valve chamber on the operator's side of said dash and covering said aperture, an opening in the valve chamber leading to the inside of the vehicle, rearwardly extending louvers in the side of the vehicle and connecting with said valve chamber, an element movable to close either the opening or the louvers, and an air inlet including an air filter mounted over said aperture.

3. In an automotive vehicle including a portion provided with an aperture, a casing fixed to said portion over said aperture, an air inlet conduit provided with a cover plate for said casing and having a screen of zig-zag shape fixed thereto in position to extend within the casing, a cloth filter arranged to lie against the screen, a tightening plate lying between the cloth and casing and provided with fingers for holding the cloth against the screen, and means for connecting said cover plate and casing.

4. In an automotive vehicle which includes an internal combustion engine and a body, a casing connected to the engine, an opening in said casing communicating directly with the atmosphere, an opening in said casing communicating with the interior of the body portion of the vehicle, an air cleaner arranged in said casing so as to remove foreign matter from air passing from said openings to said conduit, and means for controlling said openings.

5. The structure claimed in claim 4 in which said first mentioned opening is so arranged that the air is initially cleaned before it is passed therethrough.

6. In an air cleaner, a shell, a filtering element, including a frame and filtering material on said frame and unitary means to secure the filtering material to the frame and to secure the filtering element to the shell.

7. In an air cleaner, a shell, a filtering element, a cover, and unitary means for securing the shell, the filtering element and the cover together.

8. In an air cleaner, a shell, a frame, filtering material, means to secure the filtering material to the frame and unitary means to secure the shell, the frame, the filtering material and the first mentioned means together.

9. In an air cleaner, a filtering element, including a foraminous frame of zigzag conformation, filtering cloth covering the frame, and means to secure said filtering cloth to said frame including a plate having an opening therein and tongues on said plate extending into said opening and adapted to be positioned between the folds of the filtering cloth and on the opposite side thereof from said frame.

10. In an automotive vehicle having a body compartment, an engine compartment, and an internal combustion engine in said engine compartment, a perforated exterior vehicle wall, a third compartment of which the wall forms a side, a conduit from said third compartment to said engine, whereby air may be drawn by the engine through said perforated wall into said third compartment, and baffles adjacent the openings and so arranged that, when the vehicle is travelling in its normal direction of travel, they will cause the current of air flowing thereby to be deflected outwardly and thus pre-cleaned before entering the perforations.

In testimony whereof I affix my signature.

HERBERT G. KAMRATH.